United States Patent
Feldman

(10) Patent No.: US 9,286,150 B2
(45) Date of Patent: Mar. 15, 2016

(54) DYNAMIC BAND BOUNDARIES

(71) Applicant: Seagate Technology LLC, Cupertino, CA (US)

(72) Inventor: Timothy R Feldman, Louisville, CO (US)

(73) Assignee: Seagate Technology LLC, Cupertino, CA (US)

( * ) Notice: Subject to any disclaimer, the term of this patent is extended or adjusted under 35 U.S.C. 154(b) by 110 days.

(21) Appl. No.: 14/028,410

(22) Filed: Sep. 16, 2013

(65) Prior Publication Data

US 2016/0012849 A1  Jan. 14, 2016

(51) Int. Cl.
   *G06F 11/00*    (2006.01)
   *G06F 11/07*    (2006.01)
   *G11B 20/12*    (2006.01)
   *G11B 20/18*    (2006.01)

(52) U.S. Cl.
   CPC ........ *G06F 11/0727* (2013.01); *G11B 20/1217* (2013.01); *G11B 20/1883* (2013.01); *G11B 20/1889* (2013.01)

(58) Field of Classification Search
   CPC ............ G06F 11/0727; G11B 20/1217; G11B 20/1883; G11B 20/1889; G11B 20/1896
   See application file for complete search history.

(56) References Cited

U.S. PATENT DOCUMENTS

| | | | |
|---|---|---|---|
| 6,556,522 B1 | 4/2003 | Ko | |
| 6,728,899 B1 | 4/2004 | Ng | |
| 7,245,445 B2 | 7/2007 | Lee | |
| 7,679,851 B1 | 3/2010 | Sun et al. | |
| 7,738,205 B2 | 6/2010 | Maeno et al. | |
| 7,752,509 B2 | 7/2010 | Ko | |
| 7,813,236 B2 | 10/2010 | Gotoh | |
| 8,179,627 B2 | 5/2012 | Chang et al. | |
| 8,270,256 B1 | 9/2012 | Juang | |
| 8,385,162 B2 | 2/2013 | Rosen | |
| 8,416,646 B2 | 4/2013 | Huang | |
| 8,432,633 B2 | 4/2013 | Grobis | |
| 8,699,185 B1 | 4/2014 | Teh et al. | |
| 8,711,500 B1 | 4/2014 | Fong et al. | |
| 8,711,665 B1 | 4/2014 | Abdul Hamid | |
| 8,724,245 B1 | 5/2014 | Smith et al. | |

(Continued)

OTHER PUBLICATIONS

Written Opinion, PCT/US2014/055955, 6 pages.

(Continued)

*Primary Examiner* — Joshua P Lottich
(74) *Attorney, Agent, or Firm* — Cesari & Reed, LLP; Kirk A. Cesari; Christian W. Best

(57) ABSTRACT

Systems and methods are disclosed for dynamic band boundaries in data storage devices, particularly devices employing shingled magnetic recording. Band boundaries may be modified to include spare sectors from guard areas between bands to achieve field defect-slipping. Band boundaries can also be shifted to migrate spare sectors from one guard area to another in order to dynamically distribute spare sectors. In one embodiment, an apparatus may comprise a data storage medium and a controller. The data storage medium may have a first and second sequence of circumferentially adjacent data sectors, and a first guard area disposed between the first and second sequence such that no sector of the first sequence is directly adjacent to a sector of the second sequence. The controller may be configured to restructure the first sequence to include a sector from the first guard area to produce a shifted first sequence.

20 Claims, 10 Drawing Sheets

(56) References Cited

U.S. PATENT DOCUMENTS

| | | |
|---|---|---|
| 8,908,310 B1 * | 12/2014 | Bai et al. ............... 360/48 |
| 8,988,800 B1 * | 3/2015 | Varnica et al. ........... 360/31 |
| 2007/0183071 A1 | 8/2007 | Uemura |
| 2008/0304172 A1 | 12/2008 | Bi et al. |
| 2009/0055620 A1 | 2/2009 | Feldman et al. |
| 2011/0304935 A1 | 12/2011 | Chang et al. |
| 2012/0212847 A1 | 8/2012 | Sato |
| 2012/0233432 A1 | 9/2012 | Feldman |
| 2012/0300325 A1 | 11/2012 | Hall |
| 2012/0300341 A1 | 11/2012 | Matsuo |
| 2013/0057981 A1 | 3/2013 | Urakami |

OTHER PUBLICATIONS

International Search Report, PCT/US2014/055955, 4 pages.
International Search Report and Written Opinion, PCT/US2014/055957, 12 pages.
Ahmed Amer, et al., Design Issues for a Shingled Write Disk System, © 2010 IEEE, 12 pages.
International Search Report and Written Opinion, PCT/US2014/055953, 9 pages.

* cited by examiner

| 1 | 2 | 3 | 4 | 5 | 6 | 7 | 8 | 9 | 10 |
|---|---|---|---|---|---|---|---|---|---|
| 11 | 12 | 13 | 14 | 15 | 16 | Isolation | Isolation | Isolation | Isolation |
| Isolation | Isolation | Isolation | Isolation | Isolation | Isolation | Spare | Spare | 1 | 2 |
| 3 | 4 | 5 | 6 | 7 | 8 | 9 | 10 | 11 | 12 |
| 13 | 14 | 15 | 16 | Isolation | Isolation | Isolation | Isolation | Isolation | Isolation |

FIG. 5a

| 1 | 2 | 3 | 4 | 5 | 6 | 7 | 8 | 9 | 10 |
|---|---|---|---|---|---|---|---|---|---|
| 11 | 12 | 13 | Defect | 14 | 15 | 16 | Isolation | Isolation | Isolation |
| Isolation | Isolation | Isolation | Isolation | Isolation | Isolation | Isolation | Spare | 1 | 2 |
| 3 | 4 | 5 | 6 | 7 | 8 | 9 | 10 | 11 | 12 |
| 13 | 14 | 15 | 16 | Isolation | Isolation | Isolation | Isolation | Isolation | Isolation |

FIG. 5b

| 1 | 2 | 3 | 4 | 5 | 6 | 7 | 8 | 9 | 10 |
|---|---|---|---|---|---|---|---|---|---|
| 11 | 12 | 13 | Defect | 14 | 15 | 16 | Isolation | Isolation | Isolation |
| Isolation | Isolation | Isolation | Isolation | Isolation | Isolation | Isolation | 1 | 2 | Defect |
| 3 | 4 | 5 | 6 | 7 | 8 | 9 | 10 | 11 | 12 |
| 13 | 14 | 15 | 16 | Isolation | Isolation | Isolation | Isolation | Isolation | Isolation |

| Isolation | Isolation | Isolation | Isolation | Isolation | Isolation | Isolation | Isolation | Isolation | Isolation |
|---|---|---|---|---|---|---|---|---|---|
| 1 | 2 | 3 | 4 | 5 | 6 | 7 | 8 | 9 | 10 |
| 11 | 12 | 13 | Defect | 14 | 15 | 16 | Isolation | Isolation | Isolation |
| Isolation | Isolation | Isolation | Isolation | Isolation | Isolation | Isolation | 1 | 2 | Defect |
| 3 | 4 | 5 | 6 | 7 | 8 | 9 | 10 | 11 | 12 |
| 13 | 14 | 15 | 16 | Isolation | Isolation | Isolation | Isolation | Isolation | Isolation |
| Isolation | Isolation | Isolation | Isolation | Spare | Spare | 1 | 2 | 3 | 4 |

706, 708, 702, 710 callouts

FIG. 7b (700b)

| Isolation | Isolation | Isolation | Isolation | Isolation | Isolation | Isolation | Isolation | Isolation | Isolation |
|---|---|---|---|---|---|---|---|---|---|
| 1 | 2 | 3 | 4 | 5 | 6 | 7 | 8 | 9 | 10 |
| 11 | 12 | 13 | Defect | 14 | 15 | 16 | Isolation | Isolation | Isolation |
| Isolation | Isolation | Isolation | 4 | 5 | 6 | 7 | 8 | Spare | 11 |
| 2 | 3 | 4 | 5 | 6 | 16 | 8 | 9 | 10 | Isolation |
| 12 | 13 | 14 | 15 | Isolation | Isolation | Isolation | Isolation | Isolation | Defect |
| Isolation | Isolation | Isolation | Isolation | Isolation | Spare | 1 | 2 | 3 | 4 |

704 callout

DYNAMIC BAND BOUNDARIES

BACKGROUND

The present disclosure relates to data storage mediums, and provides systems and method for improving data storage device performance, especially when using shingled magnetic recording.

SUMMARY

In one embodiment, an apparatus may comprise a data storage medium and a controller. The data storage medium may have a first sequence of circumferentially adjacent data sectors, a second sequence of circumferentially adjacent data sectors, and a first guard area disposed between the first sequence and the second sequence such that no sector of the first sequence is directly adjacent to a sector of the second sequence, the first guard area comprising sectors not designated for storing data. The controller may be configured to restructure the first sequence to include a selected sector from the first guard area to produce a shifted first sequence, and designate the selected sector for storing data.

In another embodiment, an apparatus may comprise a controller configured to restructure a first sequence of circumferentially adjacent data sectors of a data storage medium to include a selected sector from a first guard area to produce a shifted first sequence, the first guard area disposed between the first sequence and a second sequence of circumferentially adjacent data sectors such that no sector of the first sequence is directly adjacent to a sector of the second sequence, the first guard area comprising sectors not designated for storing data, and designate the selected sector for storing data.

In another embodiment, a device may comprise a data storage apparatus including a data storage medium having a plurality of bands of multiple tracks configured to store data in a shingled manner where one track partially overlaps and adjacent track, and guard areas disposed between bands so that no sector of one band is adjacent to a sector in another band, the guard area including a plurality of sectors designated as not for storing user data and a first spare sector. The data storage apparatus may also comprise a controller configured to shift a boundary of a first band by converting the first spare sector to a usable data sector of the first band.

BRIEF DESCRIPTION OF THE DRAWINGS

FIGS. 5a-5c are diagrams of another illustrative embodiment of a system with dynamic band boundaries;

FIGS. 7a-7b are a diagrams of another illustrative embodiment of a system with dynamic band boundaries;

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure. It is also to be understood that features of the various embodiments can be combined, exchanged, or removed without departing from the scope of the present disclosure.

Figure 1:
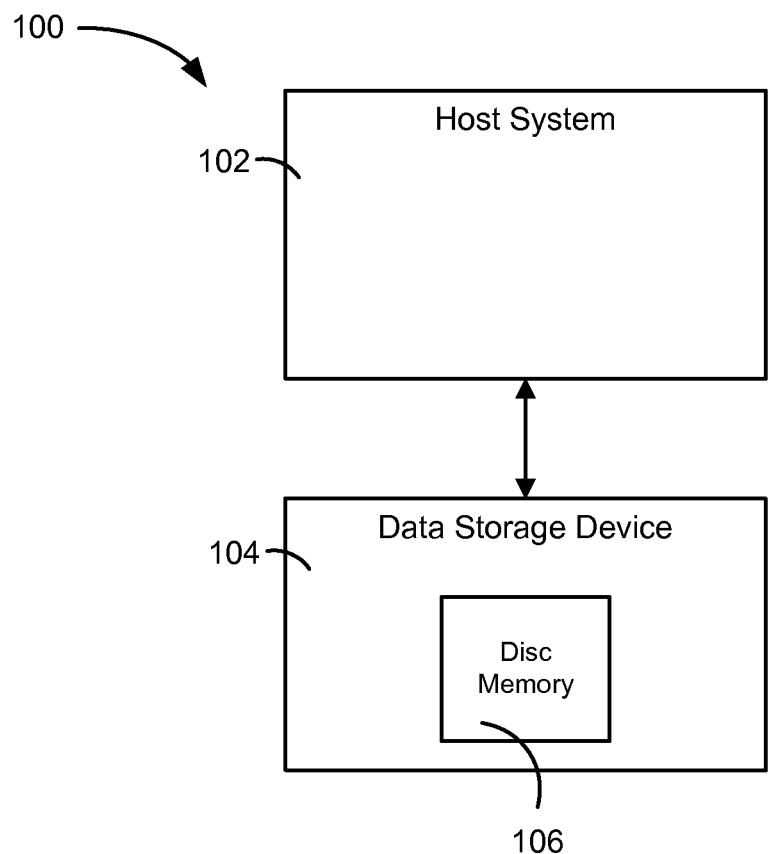
FIG. 1 is a diagram of an illustrative embodiment of a system with dynamic band boundaries.

FIG. 1 depicts an embodiment of a system with dynamic band boundaries, generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102, or the host 102 and DSD 104 may both be part of a single unit.

The DSD 104 can include one or more nonvolatile memories 106. In the depicted embodiment, the DSD 104 is a hard disc drive (HDD) including a rotating disc memory 106. In other embodiments, the DSD 104 may contain additional memories or memory types, including volatile and nonvolatile memories. For example, DSD 104 could be a hybrid HDD with both a disc memory and a nonvolatile solid state memory.

In some embodiments, DSD 104 may have one or more discs 106 having tracks for storing data. A disc 106 may be divided into multiple zones, each with a plurality of tracks. Each track can be further divided into a plurality of physical sectors for storing data. Logical sectors are chunks of data with accompanying logical block addresses (LBAs) which can be stored to the physical sectors, with the LBAs being logically mapped to the physical sector holding the respective logical sectors. For example, the DSD may maintain one or more mapping tables identifying which physical sector is storing each LBA. Each zone may have different configurations of various options, such as data track format, direction of writing from a transducer, data density, or intended uses. For example, the disc may have one or more zones designated for data storage in a shingled track manner using shingled magnetic recording (SMR), and one or more zones for storing data in a non-shingled manner. SMR is a recording method used to increase data recording density on a disc, for example by writing a track of data to partially overlap an adjacent data track. SMR will be discussed in more detail with regard to FIGS. 3-4. The disc may also have a zone designated as a $2^{nd}$ level cache using disk storage intended for non-volatile caching of data. The disc may further have at least one zone designated for spare sectors.

Figure 2:
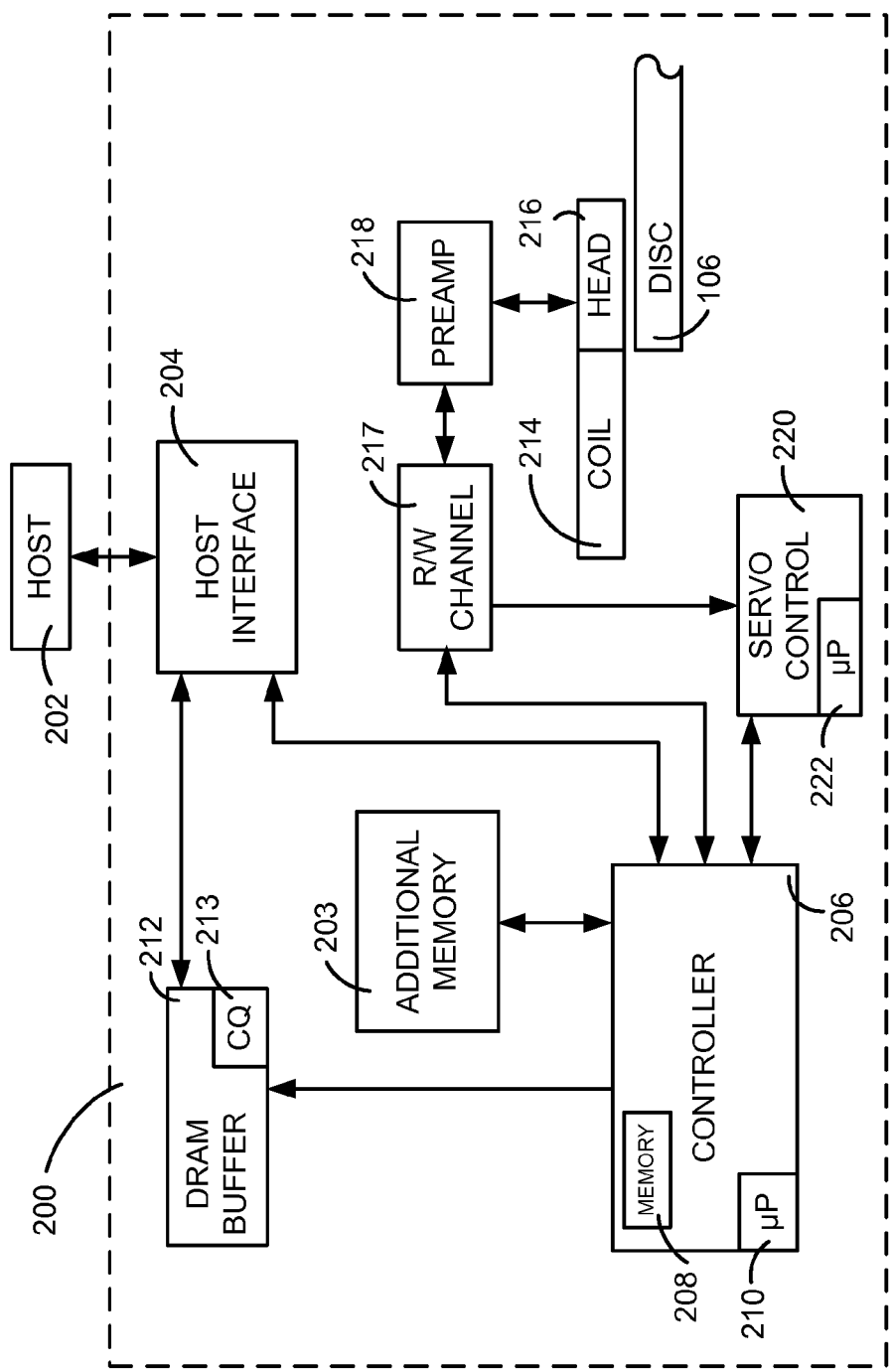
FIG. 2 is a diagram of another illustrative embodiment of a system with dynamic band boundaries.

FIG. 2 depicts a diagram of an embodiment of a system with dynamic band boundaries, generally designated 200. Specifically, FIG. 2 provides a functional block diagram of an example disc drive data storage device (DSD) 200. The DSD 200 may be a data storage device such as the disc drive 100 shown in FIG. 1. More generally, the DSD 200 can be a removable storage device, a desktop computer, a laptop computer, a server, a tablet computer, a telephone, a music player, another electronic device, any other device which may be used to store or retrieve data, or any combination thereof.

The data storage device 200 can communicate with a host device 202 via a hardware or firmware-based interface circuit 204 that may include a connector (not shown) that allows the DSD 200 to be physically removed from the host 202. The host 202 may also be referred to as the host system or host computer. The host 202 can be a desktop computer, a laptop computer, a server, a tablet computer, a telephone, a music player, another electronic device, or any combination thereof. In some embodiments, the DSD 200 may communicate with the host 202 through the interface 204 over wired or wireless communication, or by a local area network (LAN) or wide area network (WAN). In some embodiments, the DSD 200 can be a stand-alone device not connected to a host 202, or the host 202 and DSD 200 may both be part of a single unit.

The buffer 212 can temporarily store data during read and write operations, and can include a command queue (CQ) 213 where multiple pending operations can be temporarily stored pending execution. In some examples, the buffer 212 can be used to cache data. The DSD 200 can include an additional memory 203, which can be either volatile memory such as DRAM or SRAM, or non-volatile memory, such as NAND Flash memory. The additional memory 203 can function as a cache and store recently or frequently read or written data, or data likely to be read soon. A DSD 200 containing multiple types of nonvolatile storage mediums, such as a disc 106 and Flash 203, may be referred to as a hybrid storage device. The disc 106 may be configured to store data in a shingled manner.

The DSD 200 can include a programmable controller 206 with associated memory 208 and processor 210. Further, FIG. 2 shows the DSD 200 can include a read-write (R/W) channel 217, which can encode data during write operations and reconstruct user data retrieved from disc(s) 106 during read operations. A preamplifier circuit (preamp) 218 can apply write currents to the head(s) 216 and provides pre-amplification of read-back signals. A servo control circuit 220, which can include a processor 222, may use servo data to provide the appropriate current to the coil 214 to position the head(s) 216. The controller 206 can communicate with the servo control circuit 220 to move the head(s) 216 to the desired locations on the disc(s) 106 during execution of various pending commands in the command queue 213.

As discussed above, SMR is a recording method used to increase data recording density on a disc, which can be accomplished by decreasing track width below a width written by a writer element of a transducer. In other words, a disc may be formatted with tracks that have a narrower pitch than is written by a write head. This can be accomplished by partially overwriting a data track with an adjacent data track, resulting in a "shingled" track structure. For example, SMR write operations can be performed by sequencing writes so that they progress in one radial direction (i.e. tracks may be written one at a time moving from the inner diameter towards the outer diameter, or vice-versa), where tracks partially overlap each other similar to roofing shingles. Partially overwriting a track with another track may also be referred to as "trimming." A single write direction may be used across an entire disc, but can also be selected based on zones or sets of tracks, with a direction set for each zone or set of tracks.

Figure 3A:
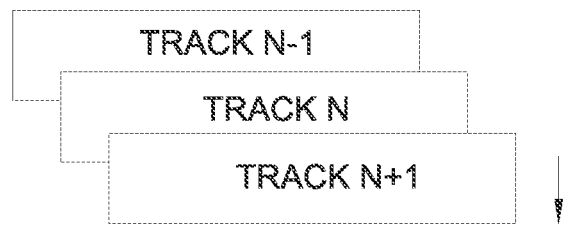
FIGS. 3a-3b are diagrams of another illustrative embodiment of a system with dynamic band boundaries.

Referring to FIG. 3a, if it is assumed that writing is performed in the arrow-indicated direction in the shingle-write scheme, when writing to track N, adjacent track N−1 may be partially overwritten. Similarly, when writing is performed on track N+1, adjacent track N may be partially overwritten. In contrast to recording methods where each track is written without any intentional overlap, SMR may result in increased recording density due to a higher tracks per inch (TPI) characteristic in a radial direction of a storage medium.

Figure 3B:
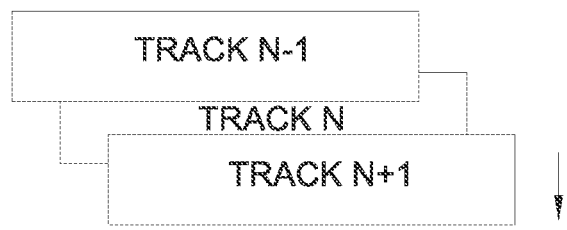

As illustrated in FIG. 3b, after writing on track N, if track N−1 is written in a reverse direction of the shingled recording direction, track N may become unreadable due to Adjacent Track Interference (ATI). Therefore, it may be advantageous to follow a constraint that track N−1 should not be written after track N is written. Accordingly, writing or modifying data on track N−1 after track N is recorded, or on track N after track N+1 is recorded, may require a different writing strategy than with non-shingled tracks, which can simply be overwritten at any time.

Figure 4A:
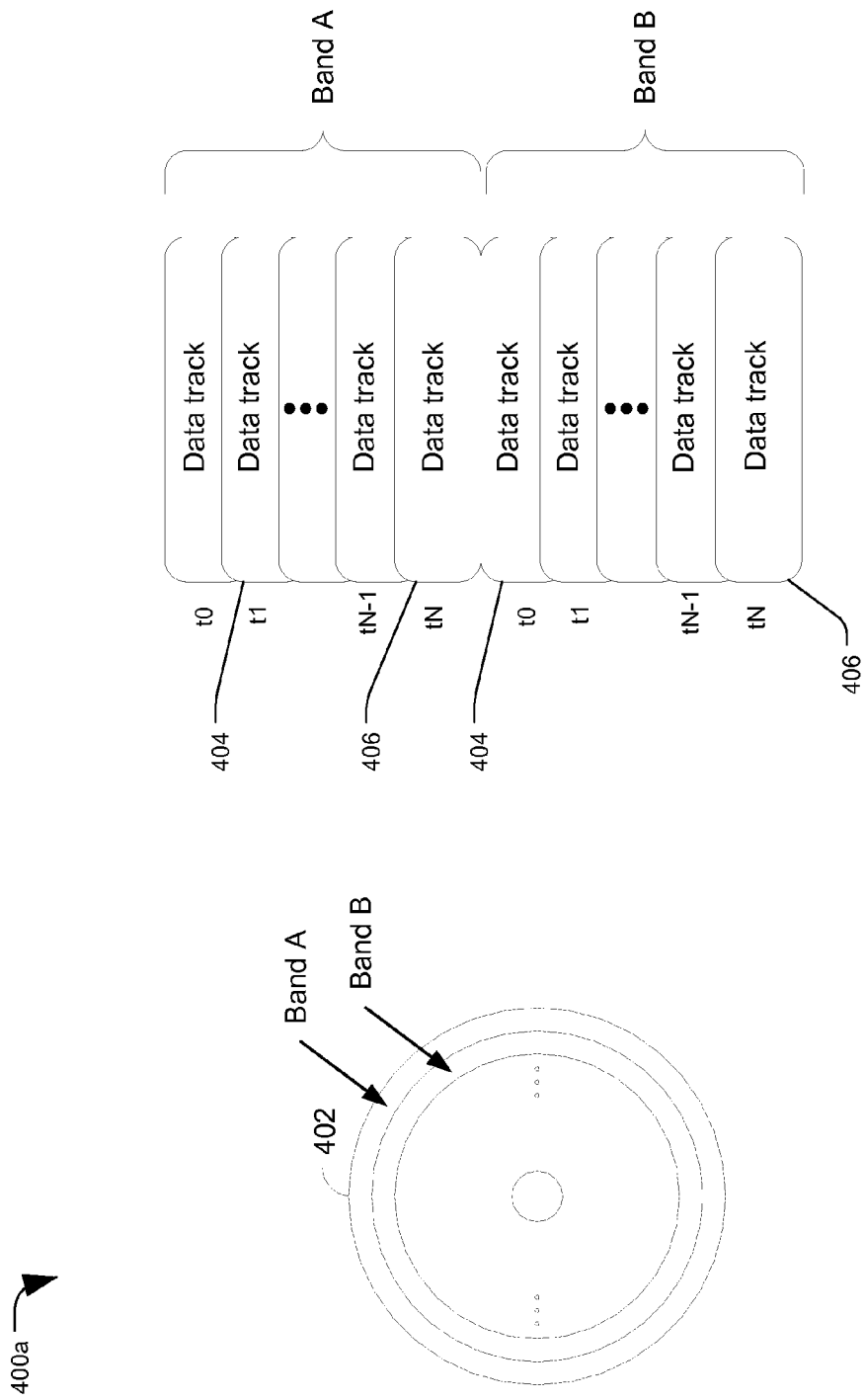
FIGS. 4a-4b are diagrams of other illustrative embodiments of a system with dynamic band boundaries.

Turning now to FIG. 4a, a diagram of another illustrative embodiment of a system 400a with dynamic band boundaries is depicted. Due to the track write overlap of SMR, writing a given track N−1 after track N has been written may require rewriting all shingled tracks that following track N−1 (i.e. track N, track N+1, track N+2, etc.). In order to accomplish this realistically, a set of tracks may be grouped into a "band," such that writing the last track of the band X does not require rewriting any of the following tracks X+1, X+2, X+3 and so on. Rotating disc media 402 may be divided into a plurality of bands (e.g. Band A, Band B, etc.), and each band may contain a plurality of shingled data tracks. In an example embodiment, disc 402 may be divided into a plurality of zones, with some zones including one or more shingled recording bands, while other zones may include non-shingled tracks. Different bands or all bands within different zones may be written in different radial directions (i.e. ID to OD, or vice versa).

Separating bands so that rewriting one does not require rewriting tracks outside the band can be accomplished by locating the tracks such that the last track of a band is not trimmed or overlapped by a track that can be written. This in turn can be accomplished in a number of ways. One approach is to select tracks to be at the end of bands and make the radial pitch allocated to these tracks the full, unshingled track width. For example, a band may include tracks having two or more track widths. Bands may have a number of shingled tracks 404, such as tracks t0 through tN−1 of FIG. 4a, which are partially overlapped by adjacent tracks and have a reduced read track pitch relative to the write track pitch. Bands may also end with an unshingled track 406, such as track tN of FIG. 4a, which does not have a reduced read track pitch relative to its write track pitch. Because the last track 406 is not overlapped by a writable track, the band can be rewritten without affecting tracks outside the band. This approach may require determining track and band layouts early in the disc fabrication process, as the final track in a band may require a different track pitch than the other tracks in the band. In other words, it may be necessary to determine where bands will begin and end prior to defining the tracks on the disc.

Figure 4B:
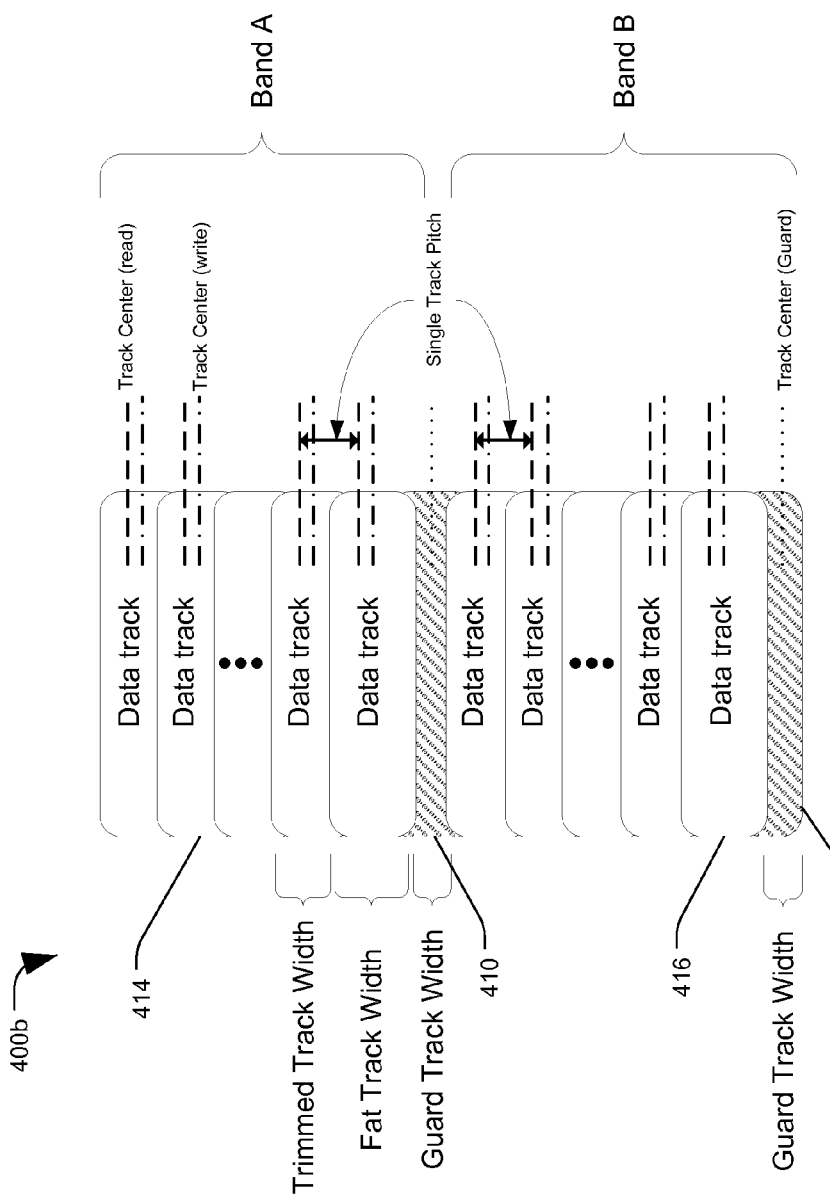

Alternatively, one or more tracks following each end-of-band track can be designated as not to be written. Turning now to FIG. 4b, a diagram of another illustrative embodiment of a system 400b with dynamic band boundaries is depicted. Not-to-be-written tracks may be referred to as "guard tracks" 410, as they provide band boundaries to separate writable tracks of different bands and guard the last track 416 of a band from being trimmed by or trimming tracks outside the band. When track N−1 needs to be re-written, tracks N−1 to the Guard Track can be rewritten, while tracks in other bands are not affected. In some embodiments, a single guard track may be used, while in some embodiments multiple tracks may be designated as "not to be written" between bands to provide a larger buffer against ATI. A guard track may also be referred to as a guard band, guard area, or isolation track. In some embodiments, an isolation track may comprise rotational (i.e. circumferential) fractions of one or more tracks instead of one or more complete tracks. For example, if each track has 100 physical sectors, an isolation track may include sectors 1-50 of Track A and sectors 51-100 of Track B, instead of being limited to using sectors 1-100 of Track B. For the sake of clarity, it will be assumed for the present examples that the tracks of the band and the isolation track are whole tracks.

In some embodiments, the guard track between bands can be a full non-shingled track (i.e. a track not trimmed by either adjacent track), but this may again require different track pitches and consequently require determining band boundaries prior to defining the tracks on the disc. In other embodiments, a guard track may be a shingled track which is not used to store data. In other words, all writable tracks and guard tracks may have the same width. Using this approach, band layouts may not need to be determined early, as the guard tracks and shingled tracks may have the same track pitch and write centers, allowing any track to be used as a guard track. In an example embodiment of a disc with multiple bands per zone, each zone may contain 110 tracks, and the 110 tracks may be divided into 10 bands containing 10 data tracks and 1 guard track each.

Guard tracks may be overlapped by both adjacent tracks without loss of data, as data may not be recorded to guard tracks. Accordingly, while all tracks may share the same width or write track center when defined on the disc, a band may include multiple track widths or read track centers in practice. As shown in FIG. 4b, trimmed tracks 414 may have one width due to being partially overlapped in one direction; the last data tracks in each band 416, or "fat tracks," may have a second track width due to not being overlapped in either direction; and the guard tracks 410 may have a third track width due to being overlapped in both directions. The read center may be designated as the same for both shingled tracks 414 and "fat tracks" 416 for simplicity, or in some embodiments the read center for fat tracks 416 can be designated as the same as the write center.

A data storage device may use mapping tables to track bands and guard areas. For example, it could reference and update a mapping table to determine which physical sectors or which range of sectors were part of band 1, band 2, etc., as well as which sectors or range of sectors were designated as guard areas between bands. The mapping tables could also track defective sectors, spare sectors, remapped sectors, and other relevant information. Algorithms may be used to make sure a sufficient number of guard sectors are situated to isolate each band from any adjacent bands.

In some embodiments it may be desirable to have bands of a varying number of tracks on the disc. For example, it may be desirable to be able to remap data from one band to another, such as by moving data from a first physical band to a second physical band, and changing the logical band identifiers for those bands (e.g. a set of data may be stored to "logical band 1," currently mapped to the first physical band, and then moved to the second physical band which then becomes logical band 1). Moving data in such a manner may require that each band have the same minimum usable data storage capacity. Tracks at the outer diameter (OD) of a disc may have a different number of usable data sectors for storing data than tracks at the inner diameter (ID). So if bands are intended to have approximately the same storage capacity, bands near the OD may desirably include a different amount of tracks or fractions of tracks than bands near the ID. While bands can be set to have the same number of tracks, this may result in inefficiency and unused physical sectors in some bands.

As stated, advanced data management schemes for shingled magnetic recording may use a minimum amount or fixed, constant amount of user capacity in each band. Bands of an integral number of tracks (i.e. using whole tracks only) may have a variable amount of capacity or a variable amount of additional capacity beyond a minimum capacity constraint. For example, assume a system with a minimum requirement of 40 logical sectors of usable data space per band. If a set of tracks have 12 physical sectors each, then a band with an integral number of tracks would need to use 4 tracks which have a total of 48 physical sectors, and the band would thus contain 8 unnecessary sectors. Lacking any other influence, the extra space in bands may be in the range of zero to one track, for an average of one half track of excess capacity above a set minimum. While some schemes attempt to take advantage of this additional capacity, it may generally be wasted or of little or no value. This can result in a large format inefficiency.

To address this inefficiency, bands can be designed to take advantage of fractional tracks instead of an integral number of tracks. For example, bands may start and end at radially varying locations such that the first and last tracks are not necessarily full tracks. Instead, the boundaries may be selected for optimally meeting constraints such as usable user capacity and band isolation. Given the geometry of a preceding band (e.g. where the band begins and ends, which may be based on the physical location of sectors on a disc), a next band may be configured to start with sufficient isolation from the preceding band, and extend to meet exactly a usable user capacity target or other desired constraint. For more information on bands employing fractional tracks, see U.S. patent application entitled "Isolated Shingled Bands of Fractional Tracks," filed for Timothy R. Feldman on the same date as the present disclosure.

Data storage devices such as disc memory may contain defective areas, such as data storage sectors, that are in some way unreliable for storing data. For example, there may be aberrations during production of the memory, or defects may arise during drive usage, such as defects from small scratches caused by a transducer head impacting a spinning disc. Drives may have some number of spare sectors that are available to be consumed or transformed into used sectors. Spares may be used as an alternate location for data previously mapped to media that is found to be defective.

One method of handling defective physical sectors may be referred to as "sector slipping" or just "slipping." Slipping may involve simply skipping over a defective sector when mapping logical sectors on a disc. For example, initial processing of a disc may comprise detecting defective areas on a disc, then mapping logical sectors of the disc around the defects. Rather than mapping logical sectors to the defective areas, slipping may comprise mapping those logical sectors immediately after the defective areas. For example, a track of a disc may have consecutive physical sectors assigned to logical sectors 10, 11, 12, [skipped], 13, and 14. In this manner, access times are not greatly affected as linear reads or writes are still possible, with the defective physical sectors being skipped over. Such slipping is typically employed when a disc is first certified and a first set of defective sectors are determined.

Another method of handling defects and spare sectors may involve a process called "alternating," "re-vectoring," or "reallocating." Alternating may comprise detecting a defect in a physical sector that already has a logical sector mapped to it, and re-mapping that logical sector to a spare sector at an alternate physical location on the data storage medium, which may be located at a relatively distant location on a memory from the defective sector. For example, a track of a disc may have consecutive physical sectors assigned to logical sectors 10, 11, 12, [defect], 14, and 15, with sector 13 remapped to a spare sector on another track. In some embodiments, a data storage medium may include a number of unshingled tracks or zones including spare sectors. A defective sector remapped to a distant spare sector may be referred to as an "alternated sector" or "alternate." "Alternating" may have performance disadvantages, particularly with rotating media, because a long access time may be required to access the spare during an otherwise fast, sequential operation. "Slipping" may have the advantage of avoiding the long access time by instead just having a short latency as the defective media is skipped.

"Field slipping" may more specifically refer to slipping after physical sectors have been mapped to logical sectors and a new defect is discovered, and may be more difficult to implement than slipping as part of an initialization process. Field slipping may be a scheme that allows a drive to maintain sequential throughput even after grown defects are found. Field slipping may be implemented on a system employing bands of writable tracks, such as the shingled recording bands described herein. Distributing spare sectors may allow a limited span of remapping to achieve slipping instead of alternating when a spare is transformed from a spare to a mapped sector. For example, spares can be distributed in between bands so that either of the neighboring bands can use the spares as needed.

FIGS. 5a through 5c show diagrams of an illustrative embodiment of a system with dynamic band boundaries. In the example of FIG. 5a there are 16 logical sectors per band and 10 physical sectors per track. There may initially be two spare sectors between the two depicted bands. FIG. 5b shows how a defect may develop or be detected in the first band, such as in the area of logical sector 14 from FIG. 5a. In some embodiments, a data storage device (DSD) may also decommission physical sectors for reasons besides defects. Rather than re-allocating logical sector 14 to a spare sector, the boundaries of the first band may be dynamically adjusted. As shown in FIG. 5b, the physical sector where logical sector 14 was previously mapped may be decommissioned and logical sectors 14 through 16 may be shifted downtrack by one physical sector each by consuming one of the two spare sectors between the first band and the second band. By remapping or restructuring a band in this manner, field slipping may be achieved and the performance disadvantage of alternating may be avoided.

It may be noted that while the spare sectors are depicted as being located at the end of the isolation band in FIG. 5a, this may merely be an abstraction. Rather than having designated "spare sectors," a memory may be formatted with an isolation band that is two sectors larger than necessary to isolate adjacent bands. These extra isolation sectors may be "consumed" from either end of the isolation band without creating overlap between bands.

In FIG. 5c, a defect may develop in what was logical sector 2 of the second band in FIG. 5b. The DSD may redefine the boundaries of the second band by consuming the remaining spare sector between the first and second bands to shift the first two logical sectors of band 2 uptrack by one physical sector.

It can be seen that each band may employ slipping instead of alternating in response to a defect. By locating spare sectors between adjacent bands, either band may be able to consume the spares to achieve field slipping. This may be efficient to do with bands of tracks or sectors, such as shingled magnetic recording (SMR) bands, which may employ data storage areas of discrete size that may be shifted without rewriting an entire memory. With SMR in particular, bands may be fully or partially rewritten on write commands, and therefore shifting the location of data by rewriting may not create a large additional performance burden. Writing to a shingled band may employ a read-modify-write (RMW) operation, where data may be read from the band, new data may be added in or modified, and the modified data may be rewritten to the band. Since this may already require rewriting most or all of the band, shifting the location of written data may only create a small additional burden.

For example, a command may require rewriting logical sectors 11 through 16 of the first band in FIG. 5a. This may involve reading the data from sectors 11 through 16, modifying the data, then writing to sectors 11, 12, 13, skipping the defect, and finally writing sectors 14 through 16, as shown in FIG. 5b. Even when a defect is discovered early in the band, as with the defect in the second band, it may not create a substantial burden to RMW the entire band instead of, for example, half of the band required by a write operation. The example of FIGS. 5a through 5c also demonstrate that band boundaries can be moved at the start of the band as well as at the end of the band when band boundaries are moved to include a transformed spare or isolation sector.

Figure 6:
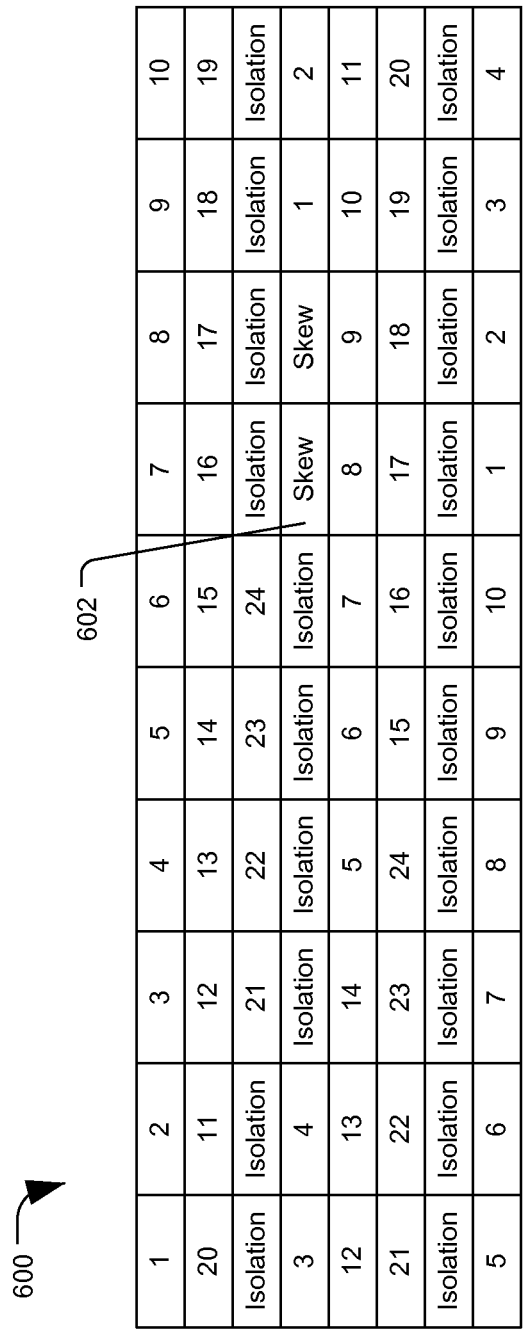
FIG. 6 is a diagram of another illustrative embodiment of a system with dynamic band boundaries.

FIG. 6 shows a diagram of an illustrative embodiment of a system with dynamic band boundaries, generally designated 600. As shown in FIG. 6, data storage media may be formatted with more unused sectors 602 in the isolation bands to produce a track-to-track skew so that sequential media operations that span band boundaries complete faster. For example, as a transducer head moves between tracks on a disc, the rotation of the disc means that one or more physical sectors may pass before a head can fully transition between the tracks. To compensate for this transition period, logical sectors may be skewed on a disc by one or more sectors so that the head can continue reading sequential data as soon as it reaches the new track, instead of waiting for the disc to make a full revolution to continue reading. As shown in diagram 600, skew sectors 602 may be useful in in bands that end with a partial rotational track, while skew sectors may not be necessary if a band ends with a complete rotational track. A DSD using dynamic boundaries may employ an algorithm for selection of band boundaries, which may use inter-band skew as a constraint that the algorithm must take into account in addition to the location of defects and desired performance constraints. In other words, depending on a need for skew sectors or similar constraints, certain physical sectors may or may not be used as spare sectors for dynamically shifting band boundaries.

In an example embodiment, a defective sector may be detected in a band. For example, the defect may be detected while performing a memory diagnostic routine, while performing a read after write (RAW) routine, when performing a read such as with a read command or a RMW operation, while performing reads for speculative pre-fetching, or through other methods. The defective sector may be added to a defect table, such as a pending defect table for sectors that have not yet been addressed with spare sectors. The next time the DSD attempts to write to the band including the defective sector, the DSD may check to see if a spare sector is available adjacent to the target band, either located at the beginning or the end of the band. If so, the DSD may read any necessary data from the band, update mapping tables to redefine the band boundaries, and write the data to the newly redefined band while slipping over the defective sector. In some embodiments, a DSD may wait to remap the defective sector until a write or rewrite involving the defective sector is received. In other embodiments, the DSD may adjust a write or rewrite operation to include the entire band, if necessary. In some embodiments, a device may not wait for a write operation, and may remap a band as soon as a defect is discovered. In some embodiments, how a device performs may depend on a current workload, with remapping being more likely when a device is idle or under a light workload.

A DSD may update mapping tables to reflect restructured bands and guard bands, such as band or portions of bands that may have shifted. For example, if a defect is detected in a band, the defective sector(s) may be added to a defect list and appropriate mapping tables. The DSD may then determine that a spare sector is available in a guard band adjacent to the band, and may mark the guard band sector consecutively following the last sector of the band as now part of the band in the addressing tables. Logical addresses mapped to all sectors from the defective sector to the guard band may be shifted over by one sector to skip the defect and to include the new repurposed spare sector from the guard area, with mapping tables updated accordingly.

Returning to the examples of FIGS. 5a-5c, all of the spares between the bands may have been consumed and additional decommissioned sectors may require alternation instead of slipping. However, by making a band boundary location selection on re-writes of bands, available spares can migrate from one area of the media toward areas where spares have been consumed, thus making spares available again where they may previously have been depleted. Bands for a disk drive may be dynamically shifted to redistribute spare capacity in a way that may keep spares allocated to every band, even as spares are transformed into used sectors. This may allow continuous rebalancing of spares so that the spares are redistributed equally, at least within the discrete math of non-divisible spares. An ongoing adaptation of band boundaries can accommodate non-uniform consumption of spare sectors over the life of a drive. It is possible that the isolation requirements between bands may vary by rotational position, say based on whether the first (or last) sector of the band starts (or ends) at a servo burst. These considerations can be included in the algorithm that controls the band boundary movements. For example, shifting the boundary of a band may create a need for an additional isolation sector. In such a case, one spare sector may become an isolation sector that cannot be redistributed to preserve sufficient band isolation.

Turning to FIGS. 7a and 7b, diagrams of another illustrative embodiment of a system with dynamic band boundaries are shown. In the example of FIG. 7a, two full bands of 16 logical sectors are depicted with a configuration as shown in FIG. 5c, meaning each of the two bands consumed a spare sector from the isolation track between the bands. FIG. 7a also shows that no spare sectors may be available in the isolation track preceding the first band. This may mean that the first band does not have access to any more adjacent spare sectors, either before the band or after the band. Meanwhile, the isolation track following the second band may still have two unused spare sectors, at 702.

A DSD may monitor an amount of spare sectors available to the bands, and may shift bands to relocate spare sectors. Since the first band of FIG. 7a does not have access to any spare sectors, a DSD may choose to shift one or more bands to make a spare sector available to the first band. As shown in 7b, the second band may be shifted downtrack by one physical sector, and one of the spare sectors following the second band may be moved to the isolation track between the first and second bands, at 704. By shifting spare sectors, a DSD may dynamically account for the development of defects while maintaining the high performance of sector slipping.

In an example embodiment, a device may prepare for a write or rewrite operation to a target band. The device may determine a number of spare sectors available to one or more bands preceding or following the target band. If the preceding or following bands can only access a number of spare sectors below a threshold, the DSD may shift spare sectors to the beginning or end of the target band, as appropriate, by shifting the target band boundaries during the write or rewrite operation.

In an embodiment, a DSD may shift bands and spare sectors based on a distribution of spare sectors across a data storage medium, such as to achieve an approximately equal distribution of spares across the medium. For example, a DSD may position bands such that the total number of spares on each side of each band, such as up to the end of the accessible media, has a ratio that matches the ratio of the amount of data capacity to each side, with results rounded to the nearest integer. For example, if 50% of the total data capacity of a memory precedes a given band, then 50% of the total spare sectors of the memory should also precede that band. Inequalities in the ratio may result in the DSD moving spares from one end of a band to the opposite end during band writes, insofar as spare sectors are available to shift around the band.

On an example embodiment, let:

$C_b$=band user storage capacity, current band
$C_f$=user capacity following current band, total
$C_p$=user capacity preceding current band, total
$C=C_b+C_f+C_p$=total user capacity of media
$S_b$=spares that are immediately adjacent to current band and can be moved to guard areas before or after the current band
$S_f$=distributed spares current band, total
$S_p$=distributed spares preceding current band, total
$S_x$=spares immediately preceding this band, target
$S=S_b+S_f+S_p$=current total number of distributed spares of media In this example, spare balancing may be based on the solution to the following equation, where $S_x$ is the number of spares (in the range 0 to $S_b$, inclusive) that should be placed between the preceding band and the current band:

$$C_p/C=(S_p+S_x)/S$$

The left side of the equation may be the ratio of the capacity preceding the band to the total capacity. The right side may be the ratio of the spares preceding the current band to the total spares. Straightforward algebraic methods allow the following solution for $S_x$:

$$S_x=(C_p/C)S-S_p$$

For example, assume 300 sectors of a total 1000 sectors precede the current band, and 24 of a total 100 spares precede the current band. In this example, $$S_x=(300/1000)100-24=0.3*100-24=30-24=6$$

In order to balance the storage capacity ratio with the available spare sectors ratio, a DSD may want to position 6 spare sectors immediately preceding the current band.

Whenever a band is written or re-written, the value for $S_x$ may be calculated and used as follows:

$$S_{x,used}=\max(0,\min(S_b,\text{round}(S_x)))$$

That is, a device may use the rounded value of $S_x$ if it is between 0 and $S_b$; otherwise, use 0 (if $S_x$ is negative) or $S_b$ (if $S_x$ is larger than $S_b$). To simplify, move all adjacent spares to the end of the current band if $S_x$ is negative or 0; or move $S_x$ number of spares to the beginning of the current band, up to a maximum of all available adjacent spares ($S_b$), and any remaining adjacent spares may be moved to the end of the band. In this manner, spare sectors may migrate across a disc as bands are rewritten until spares are approximately evenly distributed.

A more complex approach may put at least one spare on each side if there is more than one spare to place ($S_b>1$) as with the following expression.

$$S_{x,used}=\max(1,\min(S_b-1,\text{round}(S_x)))$$

The more complex approach could be applied conditionally, say if a neighboring band would otherwise be left with no adjacent spares. This may be because a band with no adjacent spares would be unable to transform a spare to a used sector and remap for slipping only, but instead would have to allocate a distant spare and use alternating. The following algorithm could be used as an implementation of this conditional method:

If the preceding band has 0 immediately preceding spares and $S_b>1$
    Then $S_{x,min}=1$
    Else $S_{x,min}=0$
If the following band has 0 immediately following spares and $S_b>1$
    Then $S_{x,max}=S_b-1$
    Else $S_{x,max}=S_b$
    $S_{x,used}=\max(S_{x,min},\min(S_{x,max},\text{round}(S_x)))$ In other words, if adjacent bands do not have spares on the ends opposite the current band, spares around the current band may be balanced on both ends even if the balancing is not necessary to support a capacity-to-spares ratio.

As stated, a defect may be detected in a band with no currently available spare sectors. In such a case, alternating may be used instead of slipping to compensate for the bad sector. However, due to the ability of band boundaries to change and spare sectors to migrate, a spare sector may later become available to band currently employing alternating for a bad sector. Once a spare sector becomes available to a band, a data storage device may shift the band boundaries and implement slipping for the defective sector, removing the need to access a distant alternate spare. A DSD may constantly monitor available spare sectors and defects, analyze bands on every write operation, etc. and utilize slipping and migrating spares for newly detected bad sectors as well as for previously detected defective sectors that have not had slipping applied.

In some embodiments, a media may be able to "gain" additional spare sectors in addition to "using up" existing spares. For example, a defective sector originally in the middle of a band may eventually be useable as part of a guard area as band boundaries shift. For more detail on using defective sectors as isolation sectors, see the "Isolated Shingled Bands of Fractional Tracks" application, previously referenced herein. For example, if a defective sector can be added to a guard area due to band shifting and be used as a sector to separate two bands, another non-defective sector in the guard area may become available as a spare sector.

In some instances, depending on where the defective sector is in relation to a guard area, converting an isolation sector to a spare sector may require performing a Read-Modify-Write operation on an adjacent band in addition to a current target band. For example, referring to FIG. 7a, defective sector 706 may be used as an isolation sector, allowing the isolation sector 708 to be used for storing data. However, sector 708 may only be able to store data from the second band, due to overlapping sectors and the nature of shingled recording. Accordingly, sector 1 of the second band may be stored to sector 708, and the former sector 1 of the second band may be converted to an isolation sector. Isolation sector 710 may now be available for use as a spare sector. Therefore if a new defective sector were detected in the first band, a new spare sector could be made available for slipping by rewriting both the first and second band as described. Alternately, if a defective sector were detected in the second band, sector 708 could immediately be used as a spare sector without the need to rewrite the first band.

an isolation sector available to become a spare sector may be more efficiently used as part of an adjacent band rather than the current band, allowing the guard area to be shifted to accommodate The overall algorithm or algorithms used for boundary shifting, spare migration, and defect slipping may consider many factors, such as the state of the band that is about to be written, what defects it has, what alternates it has, what isolation constraints and spares exist at its edges, and what the distribution of spares are through the media before and after this band, among other constraints. Fewer or more constraints may be considered and weighted according to system architecture and implementation, workload, processing power, or other factors.

Figure 8:
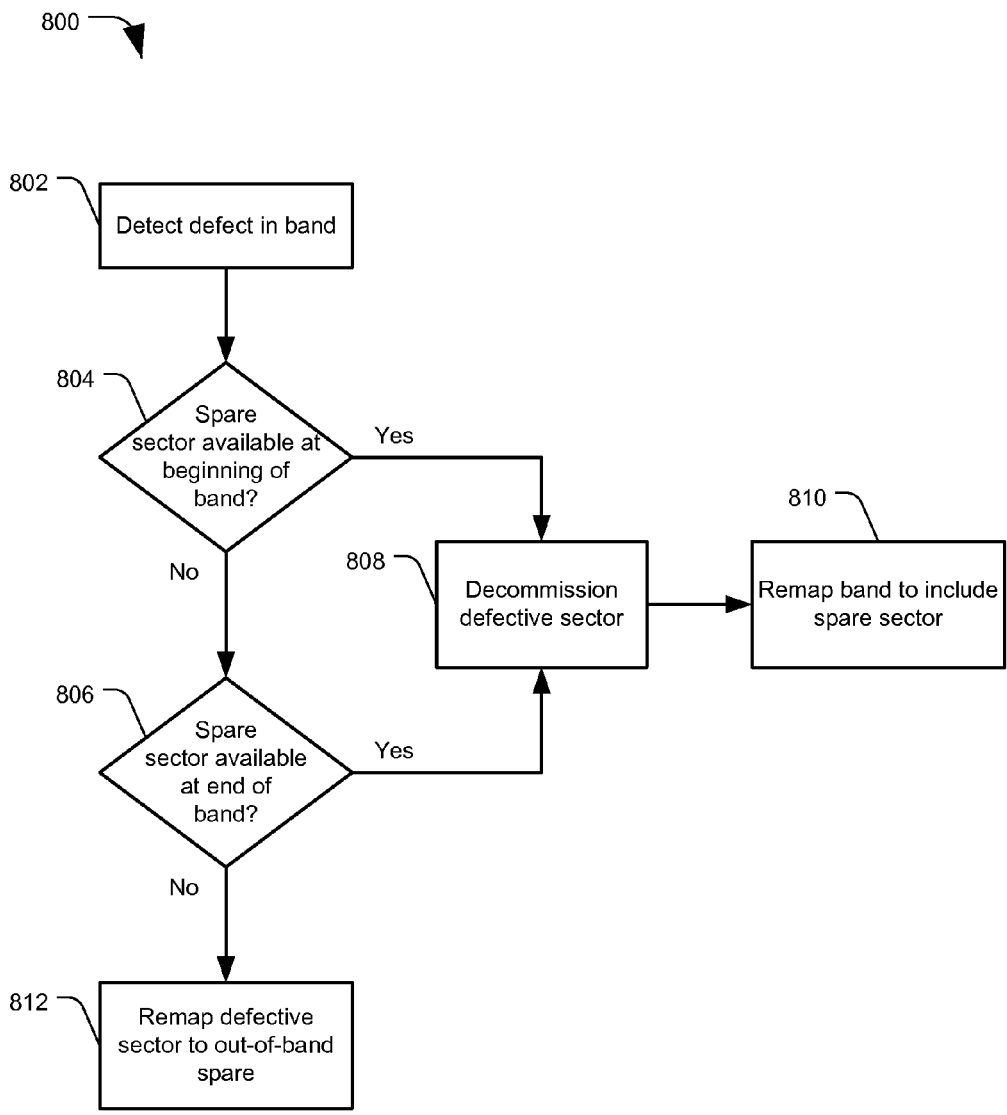
FIG. 8 is a flowchart of an illustrative embodiment of a method for dynamic band boundaries.

Turning now to FIG. 8, a flowchart of an illustrative embodiment of a method for dynamic band boundaries is shown and generally designated 800. The method 800 may comprise detecting a defect in a band, such as an unreliable data sector, at 802. The method may next comprised determining if a spare sector is available at the beginning of the band, at 804. If not, the method may involve determining if a spare sector is available at the end of the band, at 806. If a spare is available at the beginning of the band at 804, or at the end of the band at 806, the method may involve decommissioning the defective sector, at 808. This may involve attempting to read data from the sector first, as appropriate, and may involve identifying the sector as defective on a defect mapping table. The method 800 may then involve remapping the band to include the spare sector from the beginning or end of the band, at 810. For example, if the spare sector is at the beginning of the band, remapping may involve redefining the band to start one sector earlier. The remapping may involve sector slipping, so that the defective sector is skipped with the sector numbering continuing uninterrupted after the defect.

If a spare sector is not available at the beginning of the band at 804, or at the end of the band at 806, the method may involve remapping, or "alternating" the defective sector to an out-of-band spare sector located elsewhere in the memory.

In some embodiments, the end of the band may be checked for spare sectors before the beginning of the band. In some embodiments, if the entire band needs to be rewritten, the method may involve searching the beginning of the band first for a spare sector, while if only part of the band needs to be rewritten, the end of the band may be checked first. Checking for spare sectors may involve determining if more sectors exist in isolation bands preceding or following the band than are needed to isolate the bands, rather than checking for sectors designated as "spare sectors."

Figure 9:
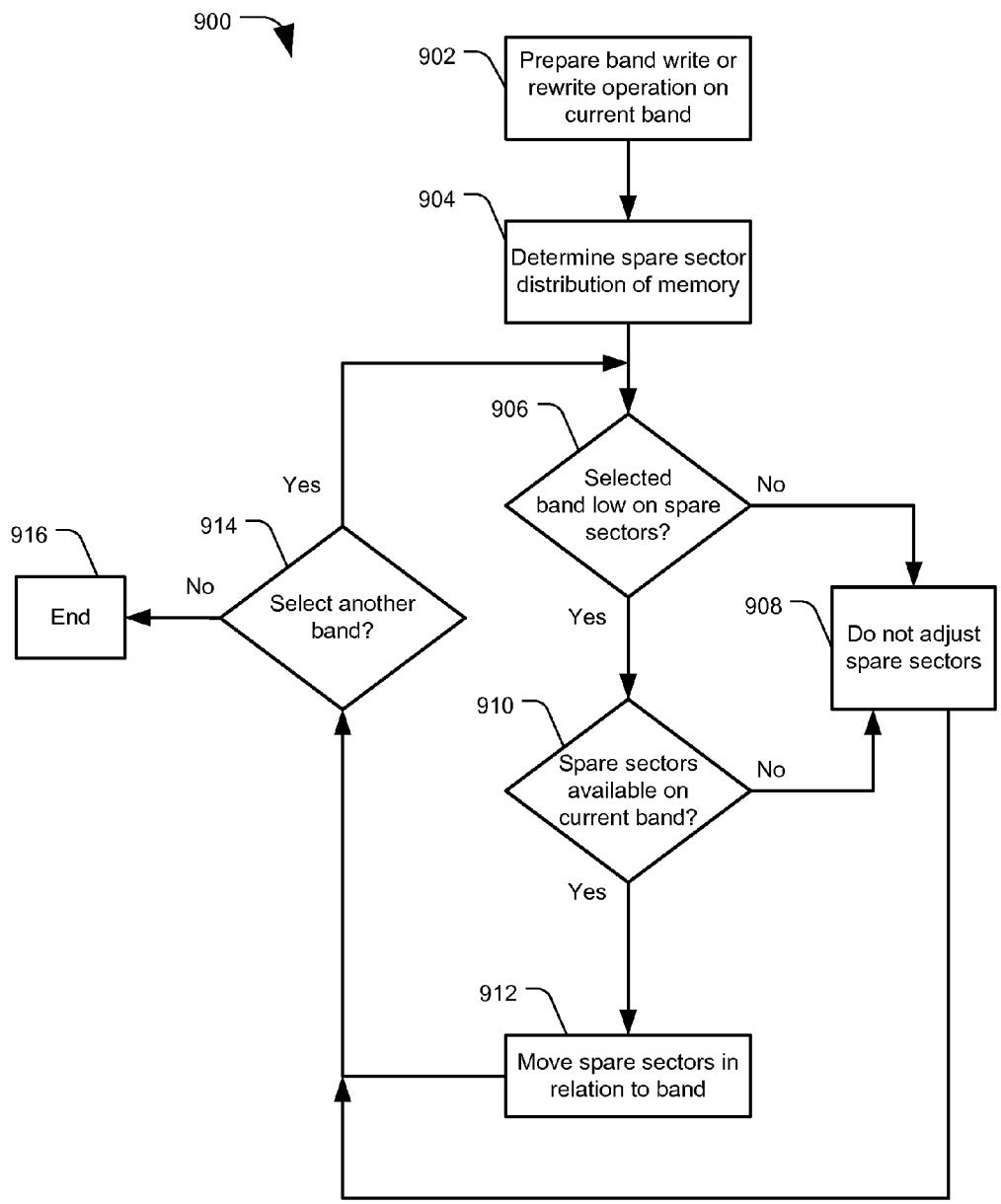
FIG. 9 is another flowchart of an illustrative embodiment of a method for dynamic band boundaries.

FIG. 9 shows another flowchart of an illustrative embodiment of a method for dynamic band boundaries, generally designated 900. The method may comprise preparing a band write or rewrite operation for a current band, at 902. For example, a data storage device (DSD) may receive a command to perform a new write or modify existing data, or the DSD may prepare a scan-rewrite in case of recorded data quality degradation, or some other operation that may involve a write or Read-Modify-Write. The method may then determine a spare sector distribution of the memory, at 904. This may involve determining a number of spare sectors available to adjacent bands, a ratio of spares to capacity for the rest of the memory, both, or other considerations. This determination may comprise an analysis of preceding bands or areas of the memory and following bands or memory regions relative to the current band. The determination may be compared against some desired distribution or spare availability threshold for the data storage medium or bands. For example, it may involve determining whether an adjacent band has below a selected threshold of spare sectors available. In the embodiment of FIG. 9, a DSD may select a band or bands to analyze adjacent to the target write band.

The method may comprise determining whether the selected band or bands are low on spare sectors, at 906. For example, this may involve determining whether the selected band or bands has access to any spare sectors. In some embodiments, the determination may include whether a ratio of memory capacity to spare sectors on a selected side of the target band shows a low percentage of spare sectors. If the selected bands are not low on spare sectors, the method may involve not adjusting the location of the target band or spare sectors to compensate the selected bands, at 908.

If the selected band or bands are low on spare sectors, at 906, the method may involve determining whether the current band has spare sectors available to relocate to the selected band or bands, at 910. If spare sectors are available at 910, the method may involve shifting the band boundaries of the current band during the write or rewrite operation to shift one or more spare sectors to the appropriate side of the band, at 912. For example, if the selected band immediately precedes the target band, the method 900 may involve determining if spare sectors are available in a guard area following the target band which can be moved to the guard area preceding the target band by shifting the target band down one sector during the write. This would make the spare sector available to the selected preceding band. If the current band does not have spare sectors available to relocate to the selected band or bands, at 910, the method may involve not adjusting any spares, at 908.

After determining whether to shift spare sectors at 912, or not adjust spare sectors at 908, the method may involve determining whether to select another band, at 914. For example, a DSD may iterate through all bands on one side of a target band to determine whether to shift available spare sectors, it the DSD may check only bands adjacent to a target band. In an embodiment, a DSD may first check a band immediately preceding the target band, and then check a band immediately following the target band. In some embodiments, a DSD may both consider an overall spare distribution on a data storage medium in addition to determining whether immediately adjacent bands require spare sectors. For example, the a disc may have sufficient spare sectors preceding a target band overall, but the band immediately preceding the target band may not have access to any spares and could benefit from shifting a spare sector.

If a determination is made to analyze another band at 914, the method 900 may proceed to determining if the selected band is low on spare sectors, at 906. If a determination is made not to analyze another band at 914, the method may end at 916.

In some embodiments, the analysis of preceding and following bands may both be performed before performing the write or rewrite operation, so that the spares available to the current band are distributed between the beginning and end of the band according to the needs of preceding or following bands. Shifting or moving spare sectors may involve defining the boundaries (e.g. a start and end sector of the band) such that the isolation bands or areas between bands are increased or decreased in size, where excess isolation sectors may be used as spare sectors by either adjacent band.

While many of the examples and embodiments disclosed herein are directed toward shingled magnetic recording, concepts and examples may also be applied to other storage mediums. For example, non-shingled storage devices may have memories configured with a number of sequences of circumferentially adjacent data sectors consecutive writable sectors separated by a number of spare sectors, where the data storage sectors can be shifted to migrate spare sectors.

In accordance with another embodiment, the methods described herein may be implemented as one or more software programs running on a computer processor, controller device, or other computing device, such as a personal computer that is using a data storage device such as a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device storing instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a data storage medium having:
      a first band of multiple tracks including a first sequence of circumferentially adjacent data sectors;
      a second band of multiple tracks including a second sequence of circumferentially adjacent data sectors;
      a first guard area disposed between the first sequence and the second sequence such that no sector of the first sequence is directly adjacent to a sector of the second sequence, the first guard area comprising sectors not designated for storing data;
   a controller configured to:
      restructure the first sequence by adjusting a boundary of the first band to include a selected sector from the first guard area to produce a shifted first sequence; and
      designate the selected sector for storing data.

2. The apparatus of claim 1 further comprising the first sequence includes a plurality of data tracks configured to store data in a shingled manner where one track partially overlaps an adjacent track.

3. The apparatus of claim 1 further comprising:
the sectors not designated for storing data include:
a first spare sector to replace defective sectors; and
isolation sectors to separate the first sequence from the second sequence.

4. The apparatus of claim 3 comprising the controller further configured to:
identify a defective sector in the first sequence;
restructure the first sequence further includes:
designate the defective sector as not available to store data; and
map the first sequence to include the first spare sector from the first guard area as the selected sector.

5. The apparatus of claim 4 further comprising:
mapping the first sequence further includes:
read a set of data sectors from a portion of the first sequence including consecutive physical sectors from a first end of the first sequence adjacent to the first guard area through the defective sector;
map the portion to consecutive physical sectors offset by one sector per defective sector towards the guard area to produce a shifted portion including the first spare sector;
write the set of data sectors to the shifted portion; and
map LBAs associated with the set of data to the shifted portion.

6. The apparatus of claim 3 comprising the controller further configured to:
determine whether a defective sector is in the first sequence;
when the defective sector is in the first sequence:
decommission the defective sector from storing data;
determine whether a sector in the first guard area is available as the first spare sector;
when a sector in the first guard area is available as the first spare sector, shift the boundary of the first band by:
map the first sequence to include the first spare sector from the first guard area; and
when a sector in the first guard area is not available as the first spare sector:
map the defective sector to an alternate physical location other than the first guard area.

7. The apparatus of claim 6 comprising the controller further configured to:
determine whether the defective sector is mapped to the alternate physical location;
when the defective sector is mapped to the alternate physical location:
determine whether a sector in the first guard area is available as a spare sector;
when a spare sector is available:
restructure the first sequence to include a spare sector from the first guard area; and
remap the defective sector from the alternate physical location to the first sequence.

8. The apparatus of claim 3 further comprising:
the data storage medium having:
a third band of multiple tracks including a third sequence of circumferentially adjacent data sectors;
a second guard area disposed between the first sequence and the third sequence such that no sector of the first sequence is directly adjacent to a sector of the third sequence, the second guard area comprising sectors not designated for storing data;
the controller configured to restructure the first sequence by:
convert a first sector of the first sequence adjacent to the first guard area to an isolation sector of the first guard area; and
convert a second sector of the second guard area adjacent to the first sequence to a data sector;
designate the first sector as not for storing data; and
designate the second sector for storing data.

9. The apparatus of claim 3 further comprising:
the data storage medium includes multiple sequences of circumferentially adjacent data sectors for data storage and multiple guard areas to separate the multiple sequences;
the controller further configured to:
determine a distribution of spare sectors across the data storage medium; and
shift at least one of the multiple sequences to redistribute spare sectors from at least one of the multiple guard areas to another of the multiple guard areas based on the determination.

10. The apparatus of claim 3 comprising the controller further configured to:
designate a defective sector in the first sequence as an isolation sector of the first guard area; and
designate another isolation sector from the first guard area that is not needed to separate the first sequence from the second sequence as a spare sector.

11. An apparatus comprising:
a controller configured to:
restructure a first band of multiple data tracks including a first sequence of circumferentially adjacent data sectors of a data storage medium to include a selected sector from a first guard area to produce a shifted first sequence,
the first guard area disposed between the first band and a second band of multiple data tracks including a second sequence of circumferentially adjacent data sectors such that no sector of the first sequence is directly adjacent to a sector of the second sequence,
the first guard area comprising sectors not designated for storing data; and
designate the selected sector for storing data.

12. The apparatus of claim 11 further comprising:
the sectors not designated for storing data include:
a first spare sector to replace defective sectors; and
isolation sectors to separate the first sequence from the second sequence.

13. The apparatus of claim 12 comprising the controller further configured to:
identify a defective sector in the first sequence;
restructure the first band further includes:
designate the defective sector as not available to store data; and
map the first sequence to include the first spare sector from the first guard area as the selected sector.

14. The apparatus of claim 12 comprising the controller further configured to:
determine whether a defective sector in the first sequence is mapped to an alternate physical location outside the first sequence;
when the defective sector is mapped to the alternate physical location:
determine whether a sector in the first guard area is available as a spare sector;
when a spare sector is available:
restructure the first sequence to include a spare sector from the first guard area; and remap the defective sector from the alternate physical location to the first sequence.

15. The apparatus of claim 12 comprising the controller further configured to:
migrate spare sectors across the data storage medium by shifting a location of the first sequence to move spare sectors from the first guard area adjacent to the first sequence on a first side to a second guard area adjacent to the first sequence on a second side.

16. The apparatus of claim 12 further comprising:
the data storage medium, including multiple sequences of circumferentially adjacent data sectors for data storage and multiple guard areas to separate the multiple sequences;
the controller further configured to:
determine a distribution of spare sectors across the data storage medium; and
shift at least one of the multiple sequences to redistribute spare sectors from at least one of the multiple guard areas to another of the multiple guard areas based on the determination.

17. A device comprising:
a data storage apparatus including:
a data storage medium having:
a plurality of bands of multiple tracks configured to store data in a shingled manner where one track partially overlaps an adjacent track;
guard areas disposed between bands so that no sector of one band is adjacent to a sector in another band, a guard area including:
a plurality of sectors designated as not for storing user data;
a first spare sector; and
a controller configured to:
shift a boundary of a first band by converting the first spare sector to a usable data sector of the first band.

18. The device of claim 17 comprising the controller further configured to:
detect a defective sector in the first band; and
perform sector slipping on the defective sector by shifting sector mapping addresses of all sectors between the defective sector and the converted spare sector by one sector towards the converted spare sector.

19. The device of claim 17 comprising the controller further configured to:
convert the spare sector to a usable data sector at a first end of the first band;
convert a second usable data sector at a second end opposite the first end of the first band into a second spare sector of a guard area adjacent to the second end; and
remap the first band as including sectors from a sector adjacent to the second spare sector to the first spare sector.

20. The device of claim 17 comprising the controller further configured to:
determine a distribution of spare sectors across the data storage medium; and
shifting the spare sector from a first end of the first band to a second end of the first band when shifting the spare sector will achieve a higher spare sector distribution balance.

* * * * *